(12) United States Patent
Hunter et al.

(10) Patent No.: US 9,810,552 B2
(45) Date of Patent: Nov. 7, 2017

(54) INDUCTIVE POSITION SENSING IN LINEAR ACTUATORS

(71) Applicant: Nucleus Scientific Inc., Cambridge, MA (US)

(72) Inventors: Ian W. Hunter, Lincoln, MA (US); George C. Whitfield, Winchester, MA (US); Peter G. Madden, Burlington, MA (US)

(73) Assignee: Nucleus Scientific Inc., Cambridge, MA (US)

( * ) Notice: Subject to any disclaimer, the term of this patent is extended or adjusted under 35 U.S.C. 154(b) by 188 days.

(21) Appl. No.: 14/688,052

(22) Filed: Apr. 16, 2015

(65) Prior Publication Data

US 2015/0300843 A1  Oct. 22, 2015

Related U.S. Application Data

(60) Provisional application No. 61/981,934, filed on Apr. 21, 2014.

(51) Int. Cl.
| | | |
|---|---|---|
| *G01B 7/14* | (2006.01) | |
| *G01D 5/20* | (2006.01) | |
| *G01B 7/12* | (2006.01) | |
| *G01B 7/00* | (2006.01) | |
| *G01D 5/14* | (2006.01) | |

(52) U.S. Cl.
CPC .............. *G01D 5/20* (2013.01); *G01B 7/003* (2013.01); *G01B 7/125* (2013.01); *G01D 5/14* (2013.01); *G01D 5/2006* (2013.01); *G01D 5/2033* (2013.01)

(58) Field of Classification Search
CPC ....... G01B 7/003; G01B 7/125; G01D 5/2006
USPC .................................................... 324/207.15
See application file for complete search history.

(56) References Cited

U.S. PATENT DOCUMENTS

| 5,204,621 A | * | 4/1993 | Hermann | ............... | G01D 5/225 |
| | | | | | 324/207.18 |
| 5,680,201 A | * | 10/1997 | Veronesi | ............... | G01B 7/003 |
| | | | | | 324/207.16 |
| 6,605,939 B1 | | 8/2003 | Jansseune et al. | | |
| 2006/0290346 A1 | * | 12/2006 | Habenschaden | ..... | G01D 5/2013 |
| | | | | | 324/207.16 |

FOREIGN PATENT DOCUMENTS

| DE | 4311973 | 2/1997 |
| DE | 10161227 | 7/2003 |
| DE | 102011004348 | 8/2012 |

* cited by examiner

*Primary Examiner* — Reena Aurora
(74) *Attorney, Agent, or Firm* — Occhiuti & Rohlicek LLP (57) ABSTRACT

A method for determining a position of a magnet assembly relative to an array of inductive elements arranged adjacent to a magnetically permeable material, the method involving: measuring electrical characteristics of each of one or more inductive elements of the array of inductive elements; and from information derived from the measured electrical characteristics of the one or more inductive elements of the array of inductive elements, determining the position of the magnet assembly relative to the array of inductive elements.

15 Claims, 8 Drawing Sheets

INDUCTIVE POSITION SENSING IN LINEAR ACTUATORS

CROSS REFERENCE TO RELATED APPLICATION

This application claims the benefit under 35 U.S.C. 119(e) of Provisional Application Ser. No. 61/981,934, filed Apr. 21, 2014, entitled "Inductive Position Sensing in Linear Actuators," the entire contents of which are incorporated herein by reference.

TECHNICAL FIELD

The invention relates generally to electromagnetic actuators, and more specifically to permanent magnet actuators, e.g. linear actuators.

BACKGROUND

An earlier filed patent application, U.S. Pat. Pub. 2014/0312716, the contents of which are incorporated herein by reference, describes a linear actuator. In its simplest form, the linear actuator includes a linear array of coils wound around a core of magnetically permeable material and an actuator assembly encircling the array of coils. The actuator assembly, which is made up of a linear array of ring magnets made of a permanent magnetic material, is arranged to move back and forth along the length of the array of coils under the control of signals that are applied to the coils. By applying appropriate signals to coils within the array, the position and movement of the actuator assembly can be controlled.

For such a linear actuator, it is useful to be able to accurately determine the location of the actuator assembly relative to the array of coils. The controller can use this positional information to determine which coils in the array to excite so as to optimally drive the movement of the actuator assembly and to accurately reposition the actuator assembly where desired. Typically, the information is determined by using an array of sensors that are mounted on the actuator. Two examples of such sensors that are mentioned in the earlier filed application are a linear potentiometer and a linear encoder.

This application describes an alternative approach to determining the location of the actuator assembly from measured electrical characteristics of the coils.

SUMMARY

In general, in one aspect, the invention features a method for determining a position of a magnet assembly relative to an array of inductive elements arranged adjacent to a magnetically permeable material, the method including: measuring electrical characteristics of each of one or more inductive elements of the array of inductive elements; and from information derived from the measured electrical characteristics of the one or more inductive elements of the array of inductive elements, determining the position of the magnet assembly relative to the array of inductive elements.

Preferred embodiments include one or more of the following features. Measuring the electrical characteristics of one or more coils involves measuring the inductance of each of more than one inductive element of the array of inductive elements. The inductive elements in the array of inductive elements are coils. The measured electrical characteristics include inductance, e.g. self-inductance and/or mutual inductance. Determining the position of the magnet assembly relative to the array of inductive elements involves accessing a data storage element storing a functional relationship for translating information derived from the measured electrical characteristics to the position of the magnet assembly relative to the array of inductive elements In general, in another aspect, the invention features a method for determining a position of a magnet assembly relative to a linear array of coils each of which is wound around a magnetically permeable material, the method involving: measuring an inductance of each of one or more coils of the array of coils; and from information derived from the measured inductance of the one or more coils of the array of coils, determining the position of the magnet assembly along the array of coils.

In general, in yet another aspect, the invention features a system including: a magnet assembly; a magnetically permeable material; an array of inductive elements located between the magnet assembly and the magnetically permeable material, said array of inductive elements arranged adjacent to the magnetically permeable material; a plurality of electronic circuits for measuring electrical characteristics of one or more inductive elements in the array of inductive elements; and a processor system programmed to determine from information derived from the measured electrical characteristics of the one or more inductive elements the position of the magnet assembly relative to the array of inductive elements.

Preferred embodiments include one or more of the following features. The magnet assembly includes permanent magnets. The inductive elements in the array of inductive elements are coils. The measured electrical characteristics include inductance, e.g. self-inductance and/or mutual inductance. The plurality of electronic circuits are for measuring the inductance of each of more than one inductive element of the array of inductive elements. The processor system includes a data storage element storing a functional relationship for translating information derived from the measured electrical characteristics to the position of the magnet assembly.

In general, in still yet another aspect, the invention features a system including: a magnetically permeable material; a linear array of coils, each of which is wound around the magnetically permeable material; a permanent magnet assembly encircling the linear array of coils; a plurality of electronic circuits for measuring an inductance of one or more coils in the array of coils; and a processor system programmed to determine from information derived from the measured inductances of the one or more coils inductive the position of the permanent magnet assembly relative to the array of coils.

The details of one or more embodiments of the inventions are set forth in the accompanying drawings and the description below. Other features, objects, and advantages of the inventions will be apparent from the description and drawings, and from the claims.

DESCRIPTION OF THE DRAWINGS

Note that like components and features in the drawings may be identified by the same reference numbers.

DETAILED DESCRIPTION

The embodiments described herein relate to methods of and systems for determining the position of a magnet or magnet array using a set of electrical coils and a volume of magnetically permeable material (e.g. iron or steel or Mu-metal).

Figure 1:
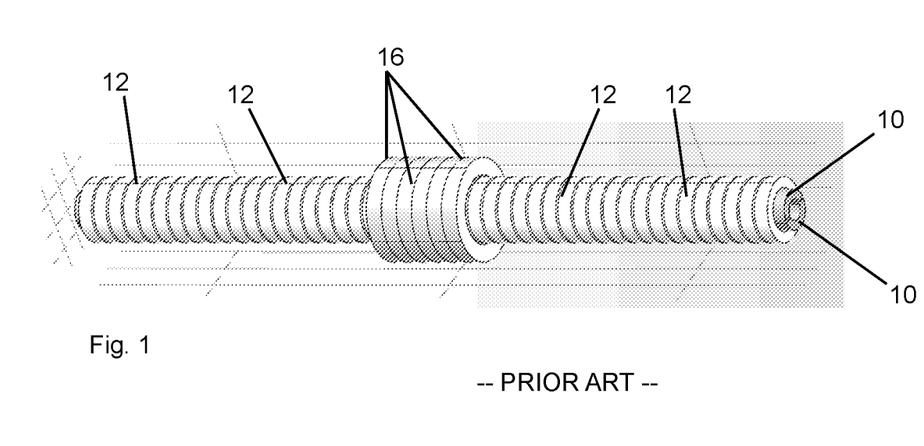
FIG. 1 illustrates a linear actuator.

The specific example used to illustrate the techniques described herein is a linear actuator that includes a set of electrical coils arranged linearly along a cylindrical iron core with a magnet or magnet array constrained to move parallel to and along the core and coils, as illustrated in FIG. 1 (Further examples are described more fully in U.S. Pat. Pub. 2014/0312716 that has been incorporated herein by reference.)

More specifically, the linear actuator includes a split core 10 having two segments made of soft ferromagnetic material, e.g. a relatively high magnetic permeability as compared to air, and low coercivity such as iron or steel or mu-metal. The two core segments are halves of a cylinder which when put side-by-side form a cylinder with a hollow central core region 11 extending along the longitudinal axis of the core.

Assembled onto the core 10 is a stack of identical coils 12 arranged adjacent to each other to form a linear coil array. They are adjacent in that they are next to each other, either touching or separated by a small distance. In this example, the coils all have the same orientation relative to the core, i.e., they are wound in the same direction about the core. However, this need not be the case; the winding directions can alternate or be arranged in some other order depending on design requirements.

Arranged on the linear coil array is a stack of ring magnets 16 (i.e., ring-shaped magnets) forming a magnet array. In the described embodiment, this magnet array is made up of a stack of six, adjacently arranged, ring magnets 16. Each ring magnet is coaxially arranged on and circumscribes the coil array. This magnet array is mechanically held together to form a magnet assembly (or actuator assembly) that is able to move back and forth along the length of the coil array (and the core) in response to forces imposed on the magnet array by currents applied to the underlying coils. That is, it is movably mounted with respect to the coil array, where movably mounted is meant to cover the case in which the magnet array is able to move along the coil array and core, if the array and core are held fixed, and the case in which the coil array is able to move relative to the magnet array, if the magnet array is held fixed.

Figure 2:
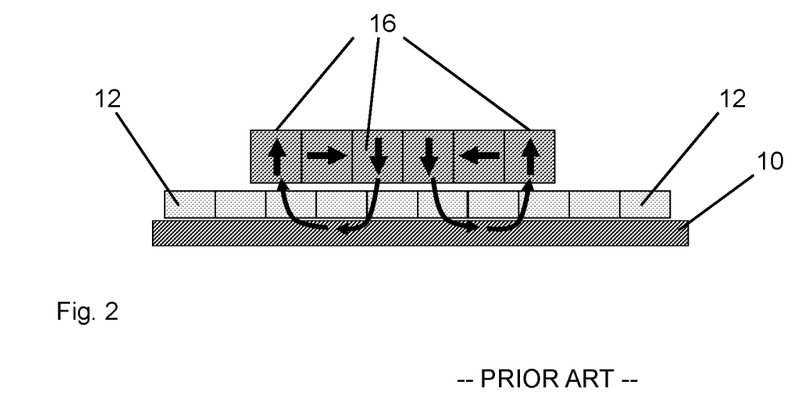
FIG. 2 illustrates in greater detail by way of a cross-section the arrangement of coils and magnets in the linear actuator of FIG. 1.

The ring magnets 16, which are permanent magnets, e.g. rare earth magnets such as neodymium-iron-boron magnets, have their polarities arranged as indicated in FIG. 2 to achieve results similar to those achieved by a Halbach array. More specifically, the six ring magnets 16 shown in FIG. 2 are arranged to augment the magnetic field on one side of the magnet array (i.e., in the coil) while reducing the field on the other side of the magnet array. The six ring magnets are arranged to form two magnetic circuits, i.e., two magnetic field loops. The top three ring magnets form a first magnetic circuit and the bottom three ring magnets form a second magnetic circuit.

In the first magnetic circuit, the magnetic field in the uppermost ring magnet is oriented radially inward; the magnetic field in the middle ring magnet is oriented upward and parallel to the axis of the coil array; and the magnetic field in the lowermost ring magnet is oriented radially outward. The three ring magnets form a single magnetic circuit which functions to reduce (e.g. partially cancel) the field outside of the magnet array while enhancing the field on the inside of the magnet array. It is a single magnetic circuit because the arrangement of magnets generates a magnetic field that forms one loop.

Notice that the arrangement of magnet polarities in the bottom circuit is the mirror image of the arrangement of the magnet polarities in the top circuit (i.e., a mirror image relative to a plane perpendicular to the axis of the coil array). In this six magnet configuration, the magnetic moment is radially oriented in the same direction over the two ring widths at the center of the actuator assembly. This increases the continuous region of the coil array over which a radially oriented magnetic field that is perpendicular to the coil current is generated.

Of course, the linear actuator could be constructed using a single magnetic circuit or more than two magnetic circuits.

When a current is applied to a coil 12 that is located in a region of the coil array that is encircled by the magnetic assembly, the interaction of the circumferential current within the coil and the radially directed magnetic field produced by the magnetic assembly generates a force vector (the Lorentz force) that is parallel to the longitudinal axis of the coil array. Depending on the polarity of the current and the direction of the magnetic field, this will cause the magnet assembly to move along the longitudinal axis of the assembly in either one direction or the other.

In the described embodiment, the width of each coil (i.e., the dimension from one side to the other along the linear axis of motion of the actuator) equals the width of the ring magnets in the array along the same axis. In other words, the coils and the magnets have an equal period. Thus, when one ring magnet is aligned with a neighboring coil, all of the other ring magnets are also aligned with corresponding neighboring coils. This, however, is not a requirement. The coils can have a different width from that of the ring magnets. For example, it has been found that choosing a magnet ring width of 1.5 times the width of the coil (i.e., that two magnet rings span three coils in the coil array) can have advantages when it comes to driving the coils to control movement of the magnet assembly.

The electrical coils 12 in this arrangement have self and mutual inductances. We can write:

$$V_j = M_{jk} \frac{dI_k}{dt} \quad (1)$$

where $V_j$ is the voltage on the $j^{th}$ coil, $I_k$ is the current in the $k^{th}$ coil, and $M_{jk}$ is the array of mutual inductances. Note that for k=j then $M_{jj}$ is the self-inductance of the $j^{th}$ coil. The elements $M_{jk}$ of the mutual inductance array depend on the geometry of the coils, the location of the coils and the magnetic permeability of the volume in between and around the coils.

The iron core 10 has a nonlinear permeability. If the field induced by the magnets is sufficiently strong, the permeability of the core will change when the magnets are in close proximity. This permeability change will change the inductances $M_{jk}$. So, the inductances $M_{jk}$ are a function of the position of the magnet or magnet array:

$$M_{jk} = M_{jk}(\vec{x}) \quad (2)$$

where $\vec{x}$ is the position of the magnets. In general, $\vec{x}$ is a vector in 3D space. For the magnet or magnet array we are discussing, we can write:

$$M_{jk} = M_{jk}(\vec{x}) \quad (3)$$

because position will vary only along one dimension.

The changes in self and mutual inductance as the magnet/magnet array move are what are used to measure the position of the magnets. Once all of a subset of the inductances have been measured, a best estimate of the position x can be found.

It can be useful to write out Equation (1) in full matrix form as:

$$V_j = M_{jk} \frac{dI_k}{dt} \quad (4)$$

$$\begin{bmatrix} V_1 \\ \vdots \\ V_n \end{bmatrix} = \begin{bmatrix} M_{11} & \cdots & M_{1n} \\ \vdots & \ddots & \vdots \\ M_{n1} & \cdots & M_{nn} \end{bmatrix} \begin{bmatrix} \frac{dI_1}{dt} \\ \vdots \\ \frac{dI_n}{dt} \end{bmatrix}$$

In general, to determine all the inductances $M_{ij}$, all the currents $I_k$ and the voltages $V_j$ must be measured. The equations are simplified if only one coil carries current (the excitation coil) and all other coil currents are zero. In that case, $$\begin{bmatrix} V_1 \\ \vdots \\ V_n \end{bmatrix} = \begin{bmatrix} M_{1k} & \cdots & M_{nk} \end{bmatrix} \begin{bmatrix} \frac{dI_k}{dt} \end{bmatrix} \quad (5)$$

because $$\frac{dI_j}{dx} = 0 \text{ for } j \neq k.$$

It the measured voltages are filtered (e.g. bandpass filtered), it is sufficient for the current to be zero within the passband frequency range. Another simplification arises if the current to voltage relationship is defined (for example if the impedance attached to the coil is constant). In that case, equation (5) still holds but the $M_{ij}$ are not the true inductances but rather are apparent or effective inductances.

It is worth noting before delving into the details that the approach for using self-inductance and/or mutual inductance for determining position involves the following key elements:

1. An array of inductors distributed through space over the range of distances that will be measured, each inductor comprising an electrically conductive material (such as copper wire wound into a coil) isolated from other electrical conductors and proximate to a magnetically permeable material (such as iron at the core of the coil).
2. An assembly of permanent magnets that emits magnetic flux of sufficiently high density to change the magnetic permeability of a significant volume of magnetically permeable material contained within or proximate to each inductor when held in close proximity.
3. Electrical circuitry capable of measuring the impedance, mutual inductance, and/or self-inductance of the inductors.

The linear actuator illustrated in FIGS. 1 and 2 possesses the first two of the three key elements. As will become clearer later, however, there are many other arrangements besides the linear actuator which also possess those key elements and for which self-inductance and mutual inductance measurements can be used to perform positions measurements.

In order to perform position measurements, the magnet assembly is permitted to move in a direction that traverses the range of distribution of the electrical inductors, while being constrained to remain at a sufficiently close proximity to change the permeability of the core. The magnet assembly is oriented such that the path of magnetic flux emitted from the assembly largely passes through the magnetically permeable material within one or more inductors proximate the magnet assembly.

Self-Inductance Based Position Measurement

The proceeding discussion of inductance applies largely to the "self-inductance" of an inductor. However, the measurement approach can be readily generalized to mutual inductances, as will be addressed in later sections.

When a sufficiently large magnetic flux from the magnet assembly enters the volume of permeable material within an inductor, the permeable material will begin to saturate, i.e., its magnetic permeability will begin to decrease towards the theoretical minimum permeability of free space. The decrease in permeability of the magnetically permeable material within an inductor results in a decrease in the electronic inductance of the inductor as can be measured by the attached electrical circuitry. The electrical circuitry is used to measure the inductance of the inductors over time, and when the inductance of any inductor is observed to decrease, the magnet assembly is known to be in close proximity to that particular inductor. By repeatedly measuring the inductance of multiple inductors within the array, the position of the magnet assembly can be inferred by noting the physical (spatial) location of any inductor that exhibits a decrease in inductance below its original value as observed outside of the presence of the magnet assembly. Alternatively, the electrical circuitry can measure the changes in impedance (magnitude and phase) as a real coil will have both resistive and inductive characteristics.

The method for computing the position of the magnet assembly over the range of distance of the inductor array in general takes into account measurements performed by multiple inductors. As the flux path of the magnet assembly is gradually moved from the vicinity of one inductor (Inductor A) to another inductor (Inductor B) in the array, the inductance of Inductor A will increase, while the inductance of Inductor B will decrease. In general, depending on the relative size and location of inductors within the array and the magnet assembly, a gradual change in inductance may be observed within more than two inductors as the location of the magnet assembly is varied. Hence, analysis of the relative values of inductance (or impedance) of each inductor in locations sufficiently close to be affected by movements of the magnet assembly may contribute information toward the determination of position.

To determine position from measurements taken on multiple coils, the relative inductance of multiple coils affected by the magnet assembly should be considered. It is important to note two aspects. First, the inductance of any such inductor (proximate the magnet assembly) will possess a known value of inductance that will vary as a function of position of the magnet assembly with respect to that inductor. And second, the position of the magnet assembly cannot be known from the inductance measured on a single inductor alone, as in this case there are two symmetrical locations where the magnet assembly can be located (on either side of the inductor in the array) that would result in such a value of inductance. Hence, unambiguous determination of position requires the measurement of at least two inductors that are under the influence (receive significant magnetic flux from) the magnet assembly.

Note, however, that if an alternative way is provided to resolve the ambiguity in the position of the magnet assembly, then measurements of a single coil might be sufficient. One such way is to remember where the magnet assembly was before the next measurement (i.e., keep a history of its movement). Or, alternatively, use another more crude sensor arrangement to roughly locate its position.

Figure 3:
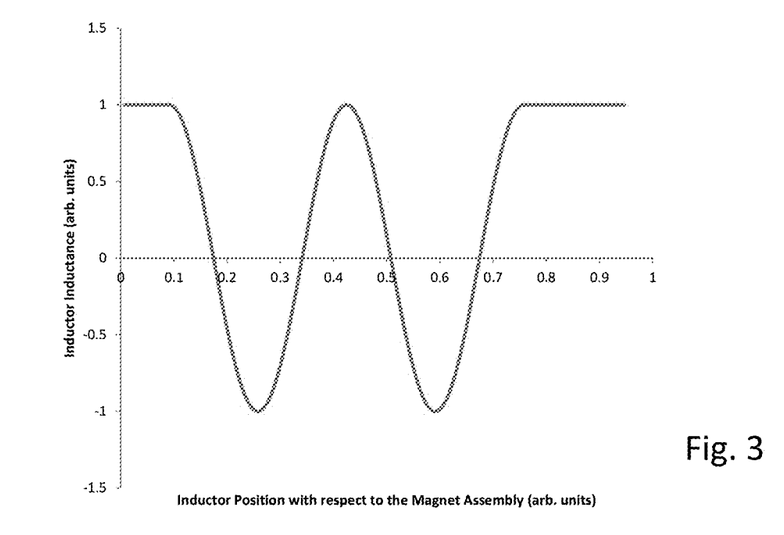
FIG. 3 is an example of a key functional relationship between the inductance of a single coil and its position along the linear actuator shown in FIG. 1.

In any event, the position of the magnet assembly will yield a known value of inductance of each inductor, as a function of the position of each inductor with respect to the magnet assembly. As depicted in FIG. 3, this general relationship can be visualized as a continuous graph of the inductance of an inductor (Y-axis in Henries) versus the location of that inductor with respect to the magnet assembly (X-axis in meters). This relationship will be referred to as the key functional relationship. This known relationship may be used to in effect fit a curve to measurements that are taken on the inductors, so that the position of the magnet assembly may be determined. Alternatively, a key functional relationship can be measured between the impedance (magnitude and phase) and the location of the inductor with respect to the magnet assembly.

Note that FIG. 3 presents the key functional relationship for an embodiment in which there are six magnets in the magnet assembly with the magnetic fields arranged as indicated in FIG. 2. In addition, the magnets in the array have the same length along the longitudinal axis, as do the coils (i.e., they have the same period).

Figure 4:
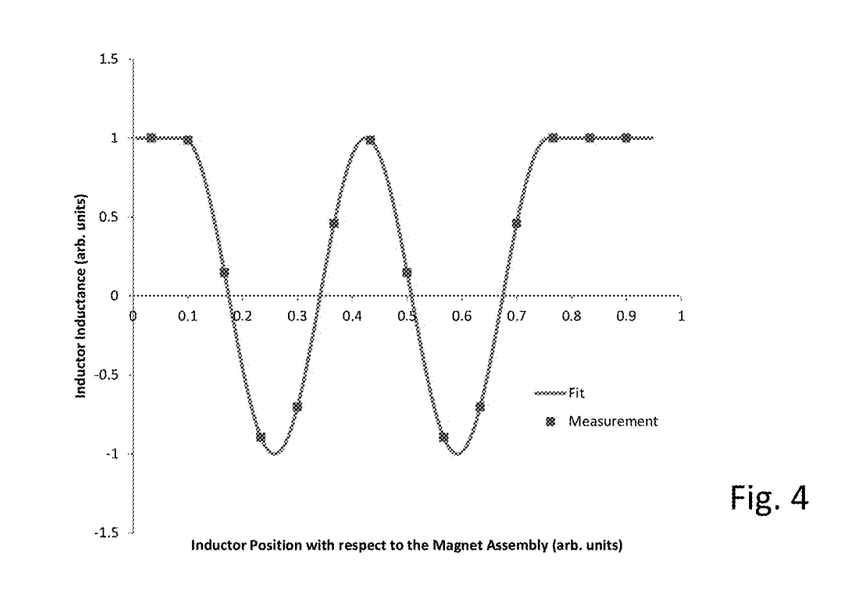
FIG. 4 is an example of a key functional relationship between the measured inductance of a single coil and its position at various points along the linear actuator shown in FIG. 1.

In general, a multiplicity of two or more inductors may be sufficiently close to the magnet assembly to experience a change in inductance as the magnet assembly is moved. The measured inductance of each inductor can then be plotted (Y-axis in Henries) on a graph versus the physical location of each inductor (X-axis in meters) (measurement data). This measurement data can then be fit to the afore-described key functional relationship between inductance and position (or between impedance and position), using a nonlinear error minimization technique (e.g. such as Levenberg-Marquardt) (see, FIG. 4). In one particular approach to fitting the key functional relationship to the measurement data, the X-axis offset (spatial variable, in meters) of the key functional relationship is unconstrained and free to vary during error minimization. The gain of the X-Axis, offset of the Y-Axis and Gain of the Y-Axis of the key functional relationship should all be held as constant values while fitting to the measurement data. In this manner, once the fit is complete, the X-axis offset (unconstrained fit parameter) will be determined at a value that is equal to the change in position of the magnet assembly with respect to the underlying inductor array.

Mutual Inductance Based Measurement Approach

The self-inductance based measurement approach can be readily generalized to measurement of the mutual-inductances between coils, in order to estimate the position of the magnet assembly. In the case of mutual inductance, instead of analyzing a single key functional relationship between position of the magnet assembly and self-inductance of each individual inductor, we now analyze a set of key functional relationships, where each element of the set comprises a functional relationship between the mutual inductance of two inductors in the system and the position of the magnet assembly. In general, the set of key functional relationships can be described by the mutual inductance matrix $M_{ij}$, where each element of the matrix may change as a function of position of the magnet assembly. The size of this matrix is $N \times N = N^2$ total elements, where N is the number of inductors in the system.

In practice, the position of the magnet assembly may be reliably measured from far fewer than the total number of elements in the N×N matrix $M_{ij}$. When a sinusoidal current is applied to a single inductor in the system (for example, at an extrema of an array of inductors) and the voltage of all other elements are simultaneously measured in response, the N×N matrix simplifies to an N-element vector along the matrix row $M_{i0j}$, where $i_0$ is the index of the inductor that is excited with current.

Figure 5:
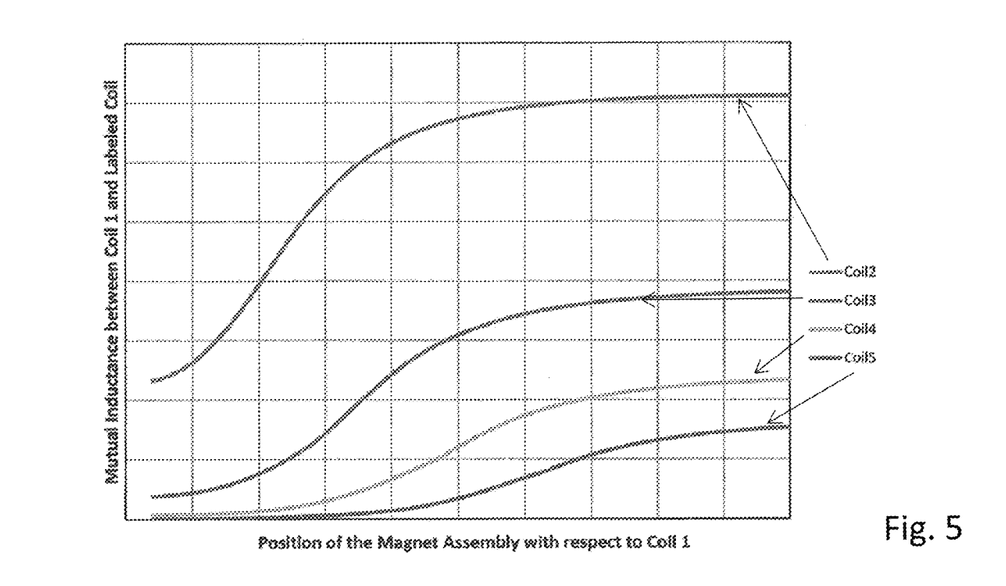
FIG. 5 shows an example set of key functional relationships between mutual inductance and position of various coils in an array of coils with respect to a first coil.

An example of this simplified Set of functional relationships is presented in FIG. 5. The figure shows on the x-axis the position of the magnet assembly with respect to a fixed reference point, in this case indicated as the location of Coil 1. The y-axis displays the mutual inductance between Coil 1 and a second coil, which changes as the position of the magnet assembly is changed. The mutual inductance relationship is shown for Coil 1 interacting with several additional coils: Coil 2, Coil 3, Coil 4, and Coil 5. It is important to note that the slope of change in mutual inductance between Coil 1 and each of the other Coils peaks at a different location along the position of the magnet assembly. By considering the set of key functional relationships together, the position may be estimated with improved accuracy than could be obtained from a single mutual inductance relationship. To accomplish this, the position estimation algorithm will give greater weight to regions of high slope in each mutual inductance relationship, to maximize reliability of estimation of position.

Selection of the Measurement Weighting Function for Maximal Signal to Noise

When inductors are sufficiently far away from the magnet assembly to experience negligible change in inductance in response to change in position of the magnet assembly, they may effectively be omitted from the number of data points included in the measurement data and used during its fit to the key functional relationship. In practice, to create a smoother transition between data points included in the fit and data points omitted from the fit, a weighting function may be used, which assigns a relative weight to each inductance measurement as it contributes towards the fit, based upon the absolute deviation of each value of inductance from its value outside of the influence of the magnet assembly. When an inductor's inductance is observed to be closer to the value of inductance that is normally observed when the inductor is outside of the influence of the magnet assembly (i.e. its maximal level of inductance), its weight in the fitting calculation should be lower. In general, the weighting function must be specified to maximize the signal to noise ratio of the measurement system.

Furthermore, it is known that when an inductor is sufficiently close to the magnet assembly and, as a result, becomes fully saturated, there is a relatively low slope (crosses through zero) in the key functional relationship. This point of minimal (zero) slope correlates to a minimal level of inductance that is known in the key functional relationship. Hence, the value of the weighting function used at this minimal level of inductance should also be low. The weighting function accordingly should peak at a value that is between the minimal and maximal levels of inductance of the key functional relationship as previously described and be correlated to the position of maximum slope in the key functional relationship. In the general case, if the magnet assembly creates a complex magnetic field, the relationship between the inductance (or impedance) and the position could have multiple stationary points where the slope of the position versus inductance (or impedance) is zero for an individual coil. The weighting function should give relatively low weighting at these positions as well. In practice, the weighting function could be correlated to the slope of the key functional relationship at all points: outside the influence of the magnet assembly and at stationary points, the inductance changes slowly and the weighting function should be small. At other points where the inductance changes rapidly, the weighting function should be higher.

Position Measurement Under High Current Conditions

As a non-ideality from the described approach and in particular at high levels of current through any of the inductors within the array, the magnetic flux induced by an electrical current flowing through the inductor may itself saturate the magnetically permeable material. In this case, the relationship between externally applied current and coil inductance will become another dimension in the key functional relationship (3D). Hence, in this case the key functional relationship (3D) may be conceptually visualized as a 3-dimensional plot of coil inductance (Z-Axis in Henries) versus relative position between the magnet assembly and the coil (Y-Axis in meters) and magnitude of current externally applied to the coil (X-Axis in amps). A nonlinear fitting approach, appropriately computationally optimized for use in a control system, may similarly be applied in order to determine position from the key functional relationship (3D) as fit to the measurement data (3D) now comprising measured inductance and measured (or known) externally applied current.

Position Measurement in the Presence of Voltage Fluctuation

As a further non-ideality in the system, any fluctuation in voltage across the coil may influence the measurement of inductance of that coil. In particular, movement of the magnet assembly across each inductor will induce a voltage due to its back-EMF. However, the velocity of the moving magnet assembly may be estimated (from previous position measurements), and that velocity estimation may, in turn, be used to estimate a voltage induced by the back-EMF of the coils that are in close proximity to the moving magnet assembly (also as determined from the previous position measurement). With the velocity-dependent voltage of each coil determined, it may then be subtracted from the actual voltage measured on each coil, to determine an estimation of voltage across each coil in the absence of back-EMF.

As another approach, to reduce unwanted voltage fluctuation from the measurement of inductance, a frequency filter may be used. A frequency filter is applied to the measured voltages such that only voltages that fluctuate at frequencies sufficiently close to the frequency of the applied current are measured. In this case, equation for voltage across each coil j can be written as:

$$V_j(f) = M_{ij}\frac{dI}{dt} = M_{ij}2\pi I_0 \cos(2\pi ft)$$

which is valid as long as no coils except coil i carry any current.

Self-Inductance Measurement

In order to determine the impedance of a coil at a perturbation frequency, the voltage across each coil may be subjected to a periodic perturbation and the current measured (or vice versa). Given an assumed equivalent circuit model of the coil (e.g. a series L-R circuit), the inductance of the coil may be estimated from the known impedance and frequency. The periodic perturbation may be swept over a range of frequencies in order to increase the accuracy of the estimation of the inductance from the assumed equivalent circuit model, as is commonly done in other applications of impedance spectroscopy and Fourier analysis. As an alternative measurement approach, the time- or frequency-domain (transformed) response of an aperiodic signal may also be analyzed to extract equivalent circuit inductance.

Figure 6:
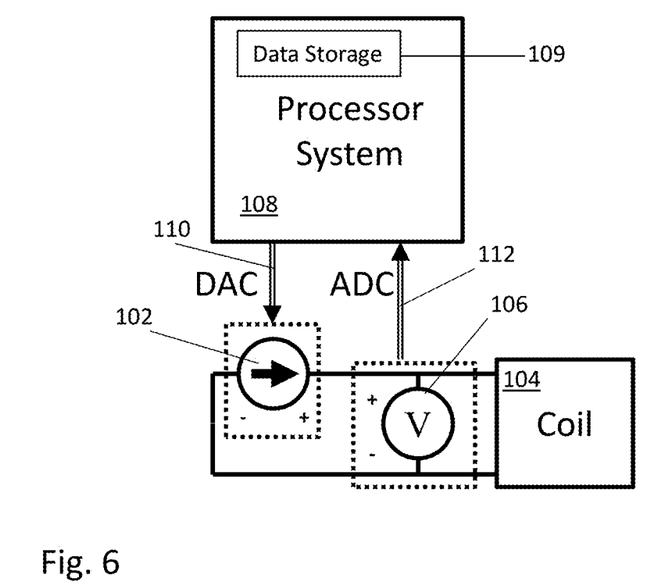
FIG. 6 is a block diagram of a circuit for measuring self-inductance of a single coil.

A block-diagram representation of a self-inductance measurement circuit 100 for a single coil is shown in FIG. 6. It includes a current source 102 driving current to the coil 104, voltage measurement circuitry 106 for measuring the resultant voltage across the coil 104, and a processor unit 108 for interpreting the results, connected to the current source 102 and the voltage measurement circuitry 106 via digital-to-analog conversion electronics 110 and analog-to-digital conversion electronics 112, respectively. The processor unit 108 also includes data storage or memory 109 that stores the key functional relationship that is used to translate the inductance measurements into the precise location of the actuator assembly along the coil array. The key functional relationship can be stored as a function or a table of data or in other known useful forms.

The self-inductance measurement circuit 100 may be replicated in order to measure the self-inductance of each coil in the array of coils.

Mutual-Inductance Measurement

To measure mutual inductance, one approach involves applying a sinusoidal current to a single coil. The voltage V induced in the other coils at that frequency is a function of the mutual inductance $M_{ij}$:

$$V_j = M_{ij}\frac{dI}{dt}$$

where I is the current, j is the coil number where the voltage is being measured and the current is applied to the coil i. For this equation to be valid, the current must be zero in all coils except coil i.

Figure 7:
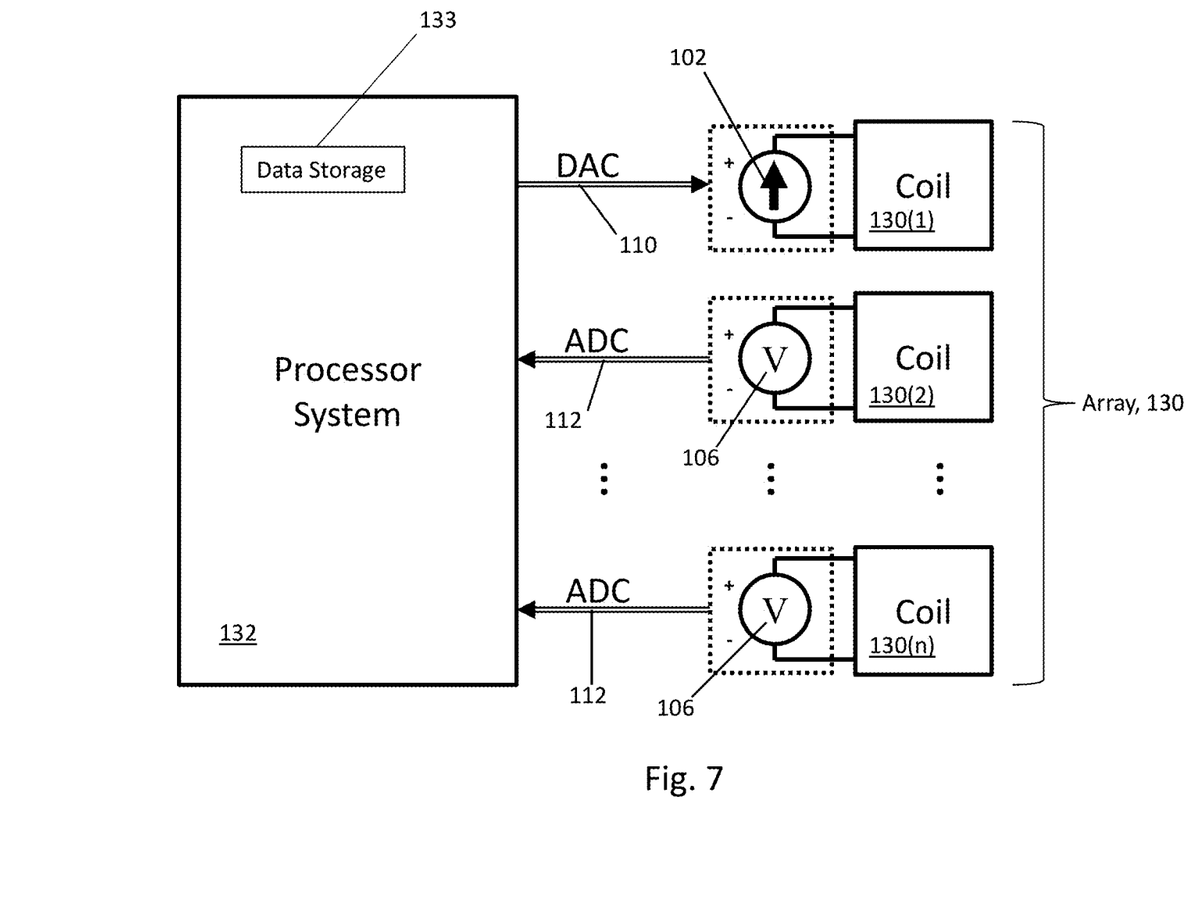
FIG. 7 is a block diagram of a circuit for measuring mutual inductance measurement of coils within an array of coils.

An example block diagram of a system that measures the mutual inductance of an array 130 of coils 130(1)-($n$) is shown in FIG. 7. In the example shown, a current source 122 applies a current to one of the coils 130(1) in the array of coils and voltage measurement electronics 106 measures voltages across multiple other coils 130(2)-($n$) in the system. All signals applied and measured are controlled and analyzed by one or more processor circuits 132 that are connected to the current source 102 and measurement electronics 106 via digital-to-analog conversion electronics 110 and analog-to-digital conversion electronics 112, respectively. The processor circuits 132 also includes data storage or memory 133 that stores the key functional relationship that is used to translate the inductance measurements into the precise location of the actuator assembly along the coil array. The key functional relationship can be stored as a function or a table of data or in other known useful forms.

In general, it is possible to measure mutual inductance between all coils through simultaneous excitation (with drive currents) and measurement (of voltages) across all coils, thereby populating the entire mutual inductance matrix $M_{ij}$ for all i and j in a single measurement.

Figure 8:
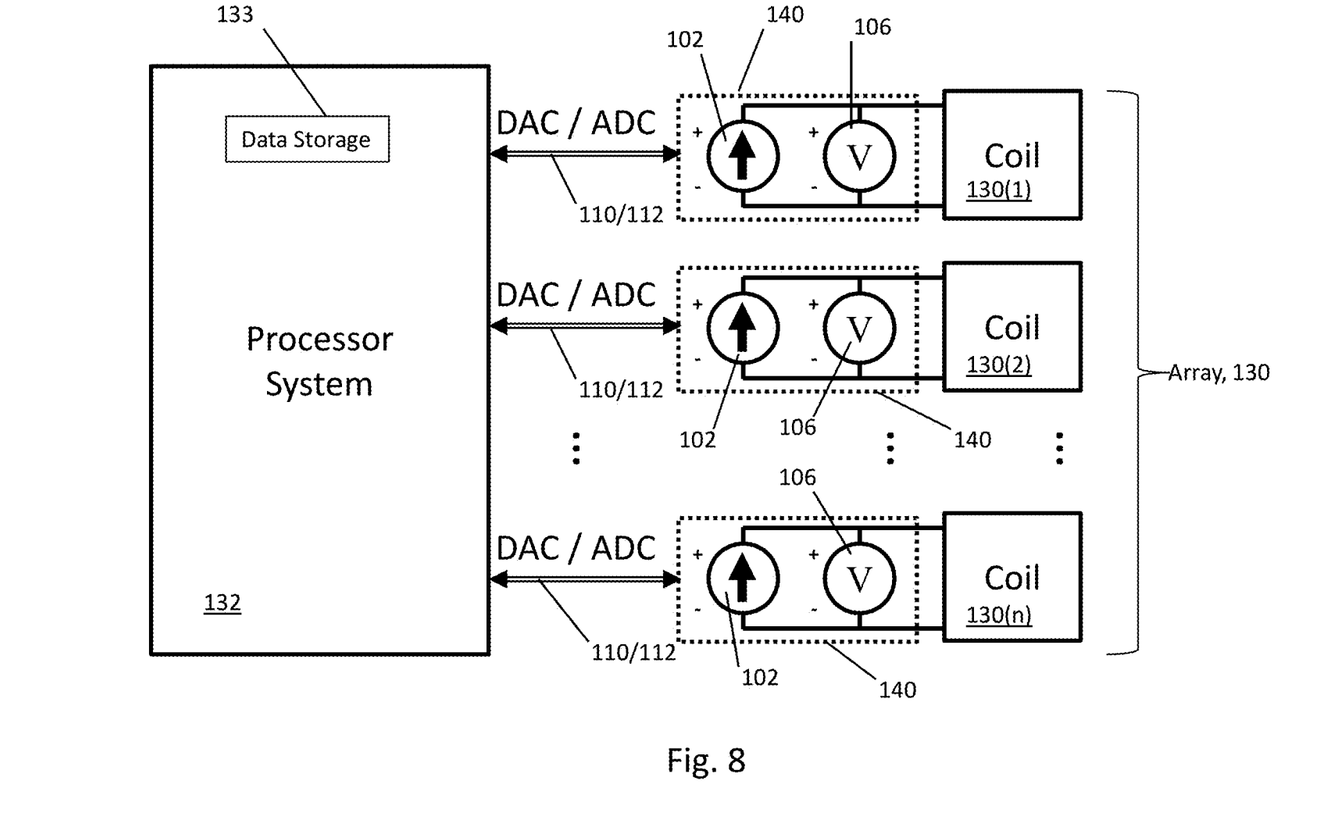
FIG. 8 is a block diagram of a circuit for measuring the self-inductance of any coil in an array of coils and the mutual inductance between any number of coils within the array of coils.

A block diagram of a system in which it is possible to measure the self-inductance of any coil and mutual inductance between any number of coils 132(1)-($n$) is shown in FIG. 8. It includes electronic circuitry 140 to enable current to be applied (102) and voltage to be measured (106) from any of the coils in an array 130. These drive and measurement electronics are connected to one or more processor circuits 132 by means of analog-to-digital conversion electronics 112 and digital-to-analog conversion electronics 110. The one or more processor circuits 132 also include data storage or memory 133 that stores the key functional relationship that is used to translate the inductance measurements into the precise location of the actuator assembly along the coil array.

In the circuits shown in FIGS. 6-8, the processor circuits are programmed to compute from the measured currents and voltages, the relevant electrical characteristics of the coils (e.g. impedance, self-inductance, and/or mutual inductances) and then analyze the computed characteristics by using pre-determined, stored key functional relationships for the coils to determine the precise position of the magnet assembly Higher-Order Mutual Inductance Effects As yet a further non-ideality of the system, the measured impedance of a first coil will be affected by changes in impedance of a second nearby coil due to a mutual inductance term. For example, if current is being driven through a second coil by a switching circuit such as an H-bridge, the changing impedance of the H-bridge will affect the measured impedance of the first coil. In particular, in the impedance of the external driving circuit may affect the measured inductance of the first coil. The relationship between the first coil applied current and measured voltage becomes a function of yet another dimension: the impedance connected to the other coils.

Implementation Constraints

In practice the nonlinear minimization technique used to fit the measurement data to the key functional relationship must be computationally optimized and determined to execute sufficiently quickly and within available computational resources in order to be useful when integrated within a closed-loop electrical/mechanical control system.

For precisely locating the magnet assembly, one could continuously measure the inductance of all of the coils. However, that would be overkill since only the coils whose inductance is affected by the proximity of the magnet assembly are really relevant. The further the coil is from the magnet assembly, the less relevant it is to determining the location of the magnet assembly. Indeed, the coil quickly becomes irrelevant as one moves away from the magnet assembly. Consequently, one can select only a subset of all the coils to be included in the inductance measurements. That subset can be determined by knowing roughly where the magnet assembly is located along the array of coils (storing historical info on the movement of the magnet assembly) or by the use of other sensor means.

In the described embodiments, the coils were arranged in a linear array. But that need not be the case. The described techniques described herein can be used in many other arrangements of coils including coils arrayed along a curve, or around a circle, or along some other one-dimensional geometric shape.

Figure 9:
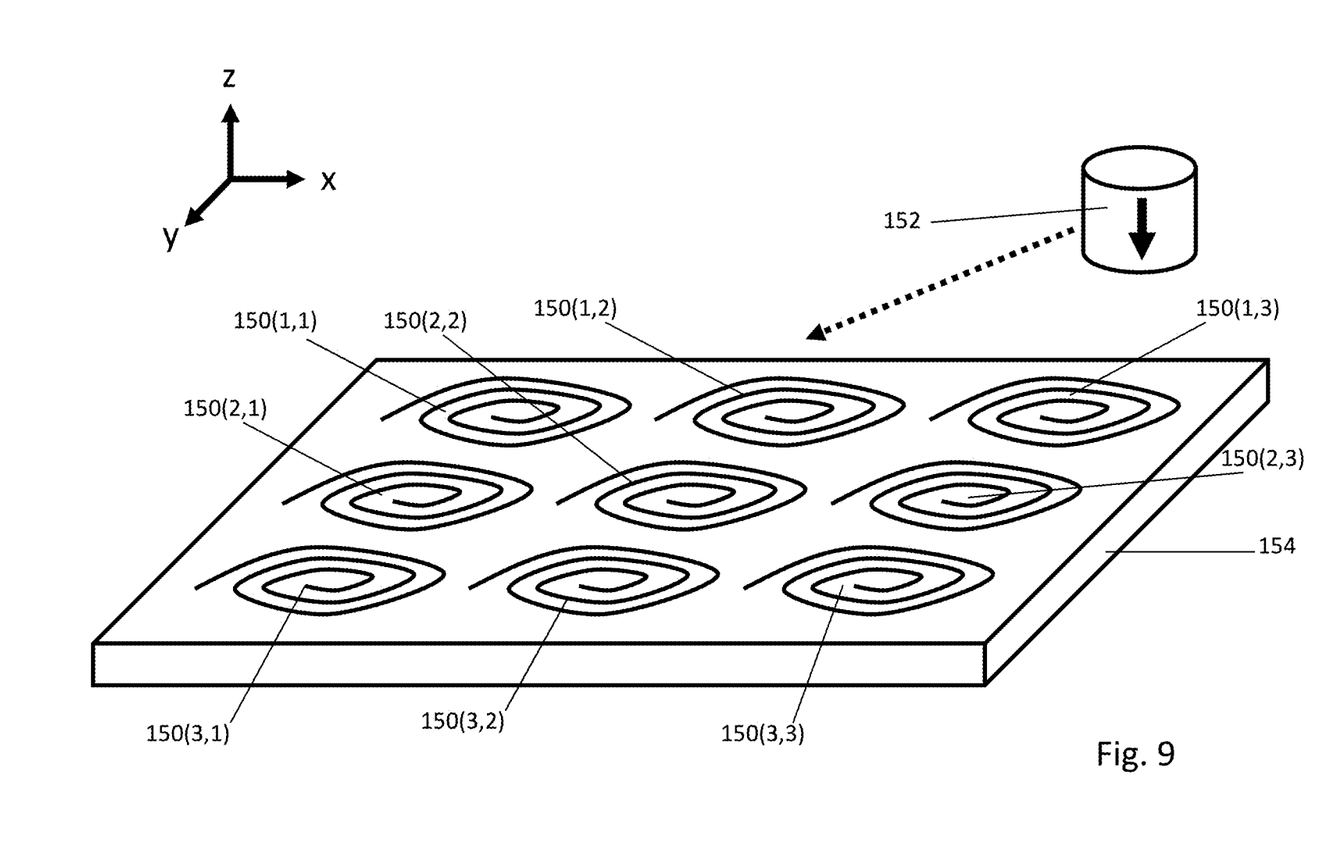
FIG. 9 illustrates a multi-dimensional (e.g. two-dimensional) implementation of a magnet position-measurement system.

In the described embodiment, the coils encircled (were wound around) the magnetically permeable material. But the techniques described herein are applicable to other geometries and other inductive elements. The coil need not be wound around the magnetically permeable material; it might simply be proximate to the magnetically permeable material. In addition, the coils might be arranged in a multi-dimensional (e.g. two-dimensional) array as indicated in FIG. 9. In that embodiment, there is an array of coils 150($x,y$) located above a flat plate of magnetically permeable material 154. In this particular example the coils are arranged in a rectangular 2-D array with equal spacing between the coils, though other arrangements could be easily imagined. A permanent magnet 152 is above the array of coils and is capable of being moved to any location within a 2-D filed above and parallel to the array of coils. The same principles as those described above are applied to this system to determine the precise position in the 2-D field (and relative to the array of coils) by measuring the inductances of one or more of the coils in the array of coils.

A key consideration in this arrangement (and in any other arrangement) is that the inductance of the inductive element is affected by the change in permeability of the nearby material as it becomes saturated by the permanent magnet when it is in close proximity. In addition, if the inductive element is a coil, the coil can be any configuration of wire or trace or conductive material whose inductance is influenced by a change in the magnetic permeability of nearby material (e.g. a flat serpentine arrangement of wires or conductive traces).

Other embodiments are within the following claims.

What is claimed is:

1. A method comprising:
   applying drive signals to drive coils of an array of drive coils arranged adjacent to each other and wound around a magnetically permeable core and coaxially aligned with an axis of the core to thereby cause a magnet assembly arranged on the array of drive coils to move along the array of drive coils and parallel to the axis of the core;
   measuring an impedance of each drive coil of a plurality of drive coils within the array of drive coils; and
   from information derived from the measured impedances of the plurality of drive coils, determining the position of the magnet assembly relative to the array of drive coils.

2. The method of claim 1, wherein the magnet assembly is coaxially arranged on the array of drive coils and circumscribes the array of coils.

3. The method of claim 1, wherein measuring the impedance of each drive coil of the plurality of drive coils within the array of drive coils involves measuring an inductance of each drive coil of the plurality of drive coils within the array of drive coils.

4. The method of claim 1, wherein measuring the impedance of each drive coil of the plurality of drive coils within the array of drive coils involves measuring a self-inductance of each drive coil of the plurality of drive coils within the array of drive coils.

5. The method of claim 1, wherein measuring the impedance of each drive coil of the plurality of drive coils within the array of drive coils involves measuring mutual inductances between the drive coils among the plurality of drive coils.

6. The method of claim 1, wherein determining the position of the magnet assembly relative to the array of drive coils comprises accessing a data storage element storing a functional relationship for translating information derived from the measured impedances of the plurality of drive coils to the position of the magnet assembly relative to the array of drive coils.

7. A system comprising:
   a core made of a magnetically permeable material and having an axis;
   an array of drive coils arranged adjacent to each other, each drive coil among the array of drive coils wound about the core and coaxially aligned with the axis of the core;
   a magnet assembly arranged on the array of drive coils and capable of moving back and forth along the array of drive coils in response to drive signals applied to the drive coils of the array of drive coils;
   a plurality of electronic circuits for measuring an impedance of each drive coil of a plurality of drive coils within the array of drive coils;
   a processor system programmed to perform the method of claim 1.

8. The system of claim 7, wherein the magnet assembly circumscribes and is coaxially arranged on the array of drive coils.

9. The system of claim 8, wherein the magnet assembly comprises permanent magnets.

10. The system of claim 8, further comprising drive circuitry for providing the drive signals to the array of drive coils.

11. The system of claim 10, wherein measuring the impedance of each drive coil of the plurality of drive coils within the array of drive coils involves measuring an inductance of each drive coil of the plurality of drive coils within the array of drive coils.

12. The system of claim 8, wherein the processor system comprises a data storage element storing a functional relationship for translating information derived from the measured impedances to the position of the magnet assembly.

13. The system of claim 10, wherein measuring the impedance of each drive coil of the plurality of drive coils within the array of drive coils involves measuring a self-inductance of each drive coil of the plurality of drive coils within the array of drive coils.

14. The system of claim 10, wherein the plurality of electronic circuits are for measuring the inductance of each drive coil of the plurality of drive coils within the array of drive coils.

15. The system of claim 14, wherein measuring the impedance of each drive coil of the plurality of drive coils within the array of drive coils involves measuring a mutual inductance of each drive coil of the plurality of drive coils within the array of drive coils.

* * * * *